US009541673B2

(12) United States Patent
Baek et al.

(10) Patent No.: US 9,541,673 B2
(45) Date of Patent: Jan. 10, 2017

(54) SPACE WEATHER MONITORING SYSTEM FOR POLAR ROUTES

(71) Applicant: Korea Astronomy and Space Science Institute, Daejeon (KR)

(72) Inventors: Ji-Hye Baek, Daejeon (KR); Jaejin Lee, Daejeon (KR); Seonghwan Choi, Daejeon (KR); Eunmi Hwang, Daejeon (KR); Young-Deuk Park, Daejeon (KR)

(73) Assignee: Korea Astronomy and Space Science Institute, Daejeon (KR)

( * ) Notice: Subject to any disclaimer, the term of this patent is extended or adjusted under 35 U.S.C. 154(b) by 2 days.

(21) Appl. No.: 14/709,997

(22) Filed: May 12, 2015

(65) Prior Publication Data

US 2015/0325130 A1    Nov. 12, 2015

(30) Foreign Application Priority Data

May 12, 2014  (KR) ........................ 10-2014-0056425

(51) Int. Cl.
*G06F 19/00* (2011.01)
*G01W 1/02* (2006.01)
(Continued)

(52) U.S. Cl.
CPC ................. *G01W 1/02* (2013.01); *G01W 1/10* (2013.01); *G08G 5/0004* (2013.01);
(Continued)

(58) Field of Classification Search
CPC .......... G01W 1/02; G01W 1/10; G08G 5/0004; G08G 5/0021; G08G 5/0091; G08G 5/00
(Continued)

(56) References Cited

U.S. PATENT DOCUMENTS 5,627,546 A * 5/1997 Crow .................... G01S 13/765
                                                    342/32
6,002,916 A * 12/1999 Lynch ................ H04B 7/18578
                                                    455/12.1
(Continued)

FOREIGN PATENT DOCUMENTS

KR      10-2010-0060704     *   6/2010
KR      10-1066878  B1          9/2011

*Primary Examiner* — Muhammad Shafi
(74) *Attorney, Agent, or Firm* — Rabin & Berdo, P.C.

(57) ABSTRACT

A space weather monitoring system for polar routes includes: a satellite which flies over polar routes; a route-information providing server which receives data collected by the satellite monitoring the polar routes and generates various pieces of information about space weather; a flight vehicle which makes a request for information about the polar routes of the flight to the route-information providing server, and flies over the polar routes based on the received information; and a network which relays data among the satellite, the route-information providing server and the flight vehicle, so that an aurora-distribution map needed for an aircraft flight, an electromagnetic wave absorption map based on the ionosphere, information about space weather, and the situation and forecast of the space weather can be provided to an airline, thereby having effects on allowing the airline to check the information about the space weather in real time and fully considering a user who is unfamiliar to the space weather.

6 Claims, 3 Drawing Sheets

(51) Int. Cl.
*G08G 5/00* (2006.01)
*G01W 1/10* (2006.01)

(52) U.S. Cl.
CPC ......... *G08G 5/0013* (2013.01); *G08G 5/0021* (2013.01); *G08G 5/0052* (2013.01); *G08G 5/0091* (2013.01)

(58) Field of Classification Search
USPC .......................................................... 701/14
See application file for complete search history.

(56) References Cited

U.S. PATENT DOCUMENTS

| | | | | |
|---|---|---|---|---|
| 6,271,877 B1* | 8/2001 | LeCompte | ........... | G01C 11/025 348/144 |
| 6,581,008 B2* | 6/2003 | Intriligator | .............. | G01W 1/10 702/3 |
| 8,220,038 B1* | 7/2012 | Lucchesi | ................ | H04L 63/105 726/4 |
| 8,861,381 B2* | 10/2014 | Sasaoka | ............ | H04M 3/42255 370/252 |
| 8,862,381 B1* | 10/2014 | Ridl | ....................... | G08G 5/045 701/3 |
| 2005/0055407 A1* | 3/2005 | Tandler | ................... | H04L 12/58 709/206 |
| 2011/0189943 A1* | 8/2011 | Ilarregui | ............ | H04B 7/18508 455/7 |
| 2014/0017992 A1* | 1/2014 | Bigras | ................... | H04B 7/195 455/12.1 |
| 2014/0156109 A1* | 6/2014 | Estkowski | ............. | G05D 1/101 701/2 |

\* cited by examiner

SPACE WEATHER MONITORING SYSTEM FOR POLAR ROUTES

CROSS-REFERENCE TO RELATED APPLICATION

This application claims priority to and the benefit of Korean Patent Application No. 10-2014-0056425 filed in the Korean Intellectual Property Office on May 12, 2014, the entire contents of which are incorporated herein by reference.

BACKGROUND OF THE INVENTION (a) Field of the Invention

The present invention relates to a space weather monitoring system for polar routes, and more particularly to a space weather monitoring system for polar routes, which provides an aurora-distribution map, an electromagnetic wave absorption map, and space weather information needed for an aircraft flight to an airline, thereby allowing the airline to check the information about the space weather in real time and fully considering a user who is unfamiliar to the space weather.

(b) Description of the Related Art

Conventionally, there has been no system for monitoring space weather of polar routes, and therefore an airline cannot receive information about the space weather in real time and check space whether the polar routes for safety.

RELATED REFERENCE

Patent Document

Korean Patent No. 10-1066878 (Sep. 16, 2011)

SUMMARY OF THE INVENTION

Accordingly, the present invention is conceived to solve the forgoing problems, and an aspect of the present invention is to provide a space weather monitoring system for polar routes, which provides an aurora-distribution map, an electromagnetic wave absorption map, and space weather information needed for an aircraft flight to an airline, thereby allowing the airline to check the information about the space weather in real time and fully considering a user who is unfamiliar to the space weather.

In accordance with an aspect of the present invention, there is provided a space weather monitoring system for polar routes, the system including: a satellite which flies over polar routes; a route-information providing server which receives data collected by the satellite monitoring space environment and generates various pieces of information about space weather; a flight vehicle which makes a request for information about space weather over the polar routes of the flight to the route-information providing server, and flies over the polar routes based on the received information; and a network which relays data among the satellite, the route-information providing server and the flight vehicle.

The route-information providing server may include: an aurora-distribution map generator which generates an aurora-distribution map based on a distribution of aurora particles observed by the satellite; an ionosphere electromagnetic-wave absorption map generator which generates an electromagnetic-wave absorption map based on change in space weather, including a solar flare or a proton event, to be displayed on the aurora-distribution map; a space-weather information generator which generates a variety of graphs and forecasts about a solar radiation event (S), a geomagnetic storm (G), and a radio blackout (R); and a space-weather situation and forecast generator which generates space-weather situations corresponding to past 24 hours, present and tomorrow with regard to each of the solar radiation event (S), the geomagnetic storm (G) and the radio blackout (R).

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE EMBODIMENTS

Figure 1:
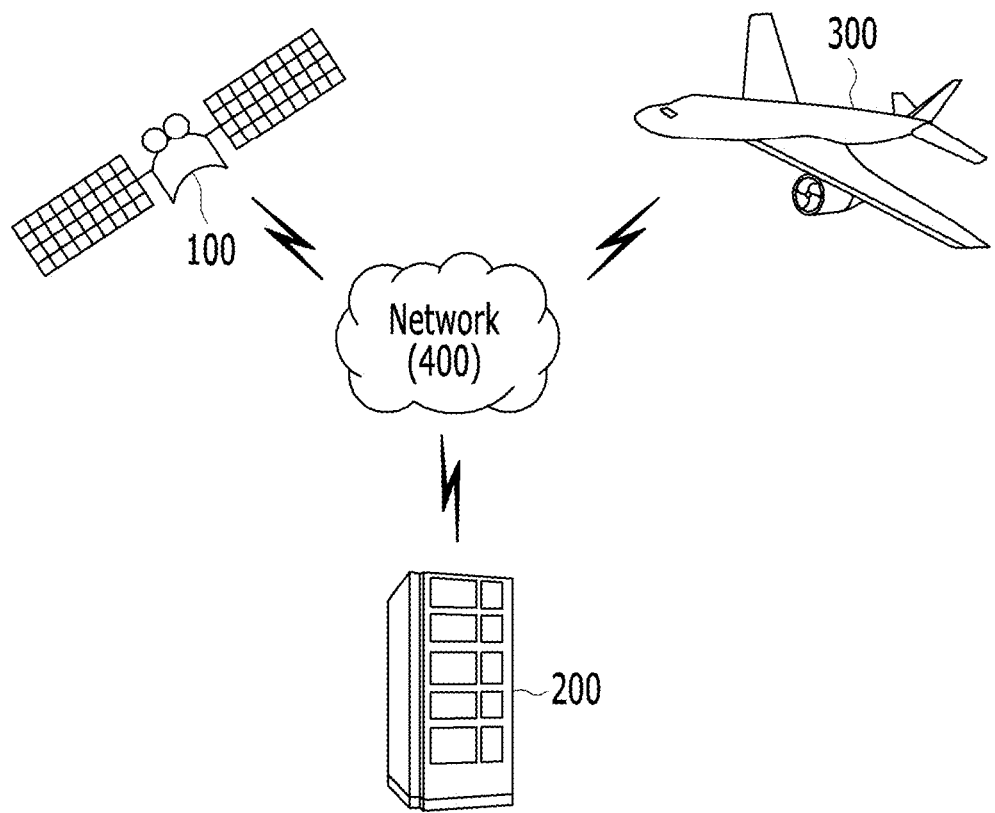
FIG. 1 is a block diagram of a space weather monitoring system for polar routes according to an embodiment of the present invention.

Hereinafter, exemplary embodiments according to the present invention will be described with reference to accompanying drawings. Also, terms and words used in the following description and claims have to be interpreted by not the limited meaning of the typical or dictionary definition, but the meaning and concept corresponding to the technical idea of the present invention on the assumption that the inventor can properly define the concept of the terms in order to describe his/her own invention in the best way.

Further, embodiments described in this specification and elements shown in the drawings are nothing but preferable examples, and do not represent the entirety of the present technical idea. Accordingly, it will be appreciated that they may be replaced by various equivalents and modifications on the filing date of the present invention.

FIG. 1 is a block diagram of a space weather monitoring system for polar routes according to an embodiment of the present invention;

As shown in FIG. 1, a space weather monitoring system for polar routes according to an embodiment of the present invention includes a satellite 100, a route-information providing server 200, a flight vehicle 300 and a network 400.

The satellite 100 has an orbit passing over the polar routes and acquires various pieces of data while monitoring the polar routes.

The route-information providing server 200 generates various pieces of information about space weather based on the data acquired by the satellite 100, and provides the information to the flight vehicle 300.

The flight vehicle 300 makes a request for information about the polar routes of the flight to the route-information providing server 200, and flies over the polar routes based on the received information.

The network 400 enables communication for exchanging data among the satellite 100, the route-information providing server 200, and the flight vehicle 300.

Figure 2:
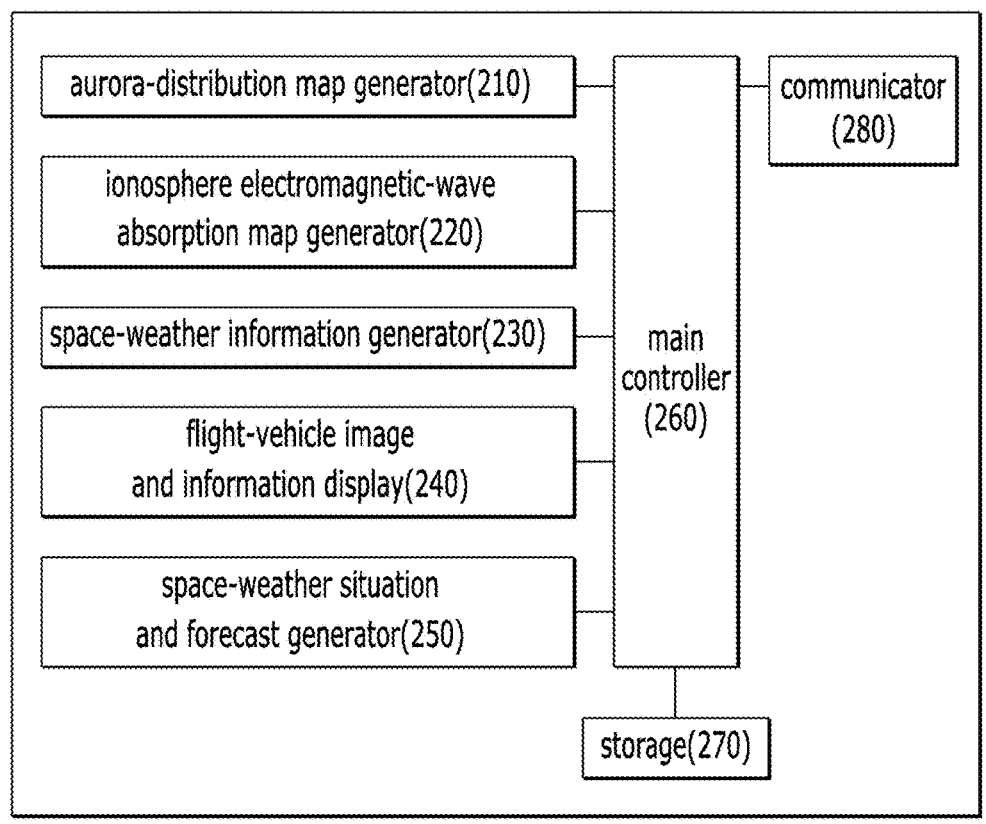
FIG. 2 is a detailed block diagram of a route-information providing server according to an embodiment of the present invention.

The route-information providing server 200, which is administered by an airline or an aviation-related organization and provides various pieces of information, as shown in FIG. 2 includes an aurora-distribution map generator 210, an ionosphere electromagnetic-wave absorption map generator 220, a space-weather information generator 230, a space-weather situation and forecast generator 240, a flight-vehicle image and information display 250, a main controller 260, a storage 270 and a communicator 280.

For reference, FIG. 2 is a detailed block diagram of the route-information providing server according to an embodiment of the present invention.

Figure 3:
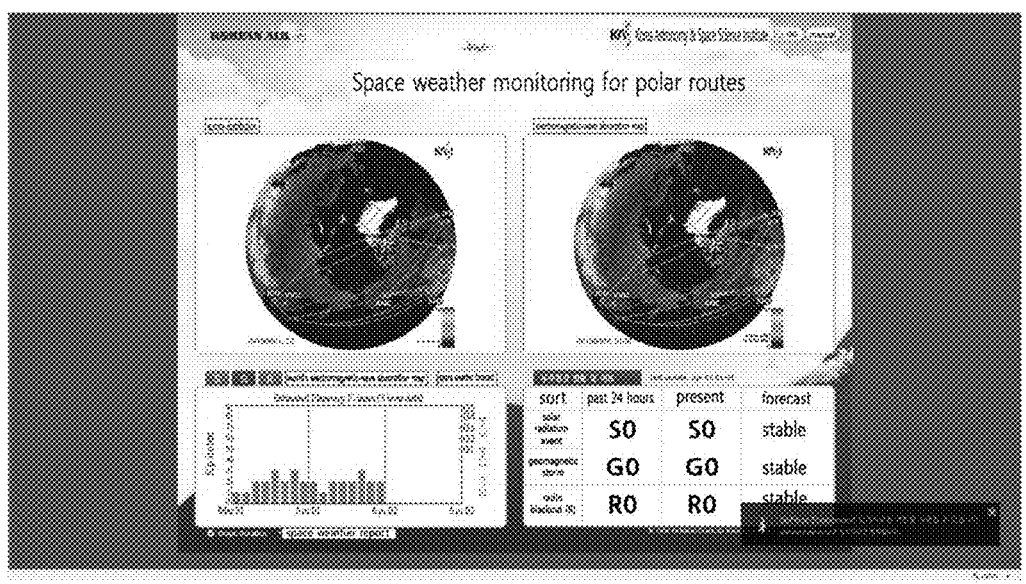
FIG. 3 shows an image on a display, which includes information provided by the space weather monitoring system for the polar routes according to an embodiment of the present invention.

Embodiments of the present invention will be described in more detail with reference to FIG. 3 showing an image on a display, which includes information provided by the space weather monitoring system for the polar routes.

The aurora-distribution map generator 210 shows a distribution of an aurora on the polar routes. To generate an aurora-distribution map, the aurora-distribution map generator 210 uses a model-calculation value based on a distribution of aurora particles observed by the polar operational environmental satellites (POES) of National Oceanic and Atmospheric Administration (NOAA) of U.S. Department.

In the arctic region, an aurora is light caused by penetration of electrons having low energy into the earth. Since the aurora may disturb the ionosphere and cause communication problems, the aurora is important for the flight vehicle 300 using the polar routes.

The main controller 260 controls the storage 270 to store the aurora-distribution map generated by the aurora-distribution map generator 210, and controls the communicator 280 to transmit the aurora-distribution map to the flight vehicle 300 so that the aurora-distribution map can be displayed on a left upper portion of a display provided in the flight vehicle as shown in FIG. 3.

The ionosphere electromagnetic-wave absorption map generator 220 generates an electromagnetic-wave absorption map based on change in the space weather, such as a solar flare, a proton event, etc. so that the electromagnetic-wave absorption map can be displayed on the polar routes.

The more the electromagnetic waves absorbed in the ionosphere, the weaker the strength of the electromagnetic waves and communication.

On the ionosphere electromagnetic-wave absorption map, decrease in the strength of the electromagnetic waves generally used for high frequency (HF) communication of the aircraft is represented in color. For example, the redder color indicates that the strength of the electromagnetic waves becomes weaker and causes a communication problem.

In addition, the main controller 260 controls the storage 270 to store the electromagnetic-wave absorption map generated by the ionosphere electromagnetic-wave absorption map generator 220 and at the same time controls the communicator 280 to transmit the electromagnetic-wave absorption map to the flight vehicle 300 so that the electromagnetic-wave absorption map can be displayed on a right upper portion of the display provided in the flight vehicle as shown in FIG. 3.

The space-weather information generator 230 generates a variety of graphs and forecasts about a solar radiation event (S), a geomagnetic storm (G), a radio blackout (R), etc.

Further, as shown in FIG. 3, the main controller 260 controls the communicator 280 to transmit various kinds of space weather generated by the space-weather information generator 230 to the flight vehicle 300, so that various kinds of space weather can be displayed as initial icons on the display of the flight vehicle 300 as shown in FIG. 3. Therefore, when a user clicks the corresponding icon, the panel displays the graphs showing solar energetic proton flux, a Kp index, and an intensity of X-ray.

The main controller 260 processes the information about various kinds of space weather generated by the space-weather information generator 230 to be updated in real time, and controls space-weather warning levels R1~R5, S1~S3 and G1~G5 to be displayed on the graph. Thus, only the graphs are enough to check the present space-weather level.

The main controller 260 provides space-weather forecast data and a world electromagnetic-wave absorption map, by which flare effects can be easily understood, in addition to the graphs of the solar radiation event, geomagnetic storm, and radio blackout.

The space-weather situation and forecast generator 240 generates the space-weather situations corresponding to the past 24 hours, the present and tomorrow with regard to each of the solar radiation event, the geomagnetic storm and the radio blackout.

The flight-vehicle image and information display 250 receives information about a real location and a flight direction, such as latitude and longitude of the flight vehicle, in the form of an extensible mark-up language (XML) file from a website that provides the location information about the aircrafts of the real world's airlines in real time, and displays the real location and flight direction of the flight vehicle 300 together with the aurora-distribution map and the electromagnetic-wave absorption map on the display of the flight vehicle 300 while displaying an image of the flight vehicle 300 at a corresponding position.

As the flight-vehicle image and information display 250 displays the image of the flight vehicle at the position corresponding to the location information received from the website, it is easy to find and check the location of the flight vehicle on the polar routes.

Referring to a right lower portion of FIG. 3, the main controller 260 shows the space-weather situations corresponding to the past 24 hours, the present and tomorrow generated by the space-weather situation and forecast generator 240, i.e. shows the highest level for the past 24 hours and the present space-weather and shows tomorrow's space-weather situation in three levels of 'stable, unstable and warning', so that a pilot of the flight vehicle can check the general change in the space weather.

As described above, the route-information providing server 200 provides a space weather image and report in the form of an image, a text or an XML file to the flight vehicle 300 through a linked concerned web page or a user's mobile phone via the network such as Internet or the like.

For example, if the main controller 260 checks the present RSG and acquires that the radio blackout (R)>2, the solar radiation event (S)>0 and he geomagnetic storm (G)>0, the route-information providing server 200 may automatically issue the space weather warning to users through a short message service (SMS).

For reference, the inequalities such as "the radio blackout (R)>2, the solar radiation event (S)>0, and the geomagnetic storm (G)>0" are given by way of example, and may be freely set by a server operator.

According to an embodiment of the present invention, a space weather monitoring system for polar routes provides an aurora-distribution map, an electromagnetic wave absorption map, and space weather information needed for an aircraft flight to an airline, thereby allowing the airline to check the information about the space weather in real time and fully considering a user who is unfamiliar to the space weather.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A space weather monitoring system for polar routes, comprising:
   a satellite 100 which has an orbit passing over the polar routes, and is configured to observe a distribution of aurora particles;
   a route-information providing server 200 which
      receives data of the aurora particles distribution from the satellite 100,
      obtains information of a change in space weather, and
      generates various pieces of information about the space weather that include information of the aurora particles distribution and information of electromagnetic-wave absorption;
   a flight vehicle 300 which makes a request for space weather information of a polar region that the flight vehicle flies over to the route-information providing server 200, and flies over one of the polar routes based on the received information; and
   a network 400 which relays data among the satellite 100, the route-information providing server 200 and the flight vehicle 300.

2. A space weather monitoring system for polar routes, comprising:
   a satellite 100 which has an orbit passing over the polar routes;
   a route-information providing server 200 which receives data collected by the satellite 100 monitoring space environment and generates various pieces of information about space weather;
   a flight vehicle 300 which makes a request for space weather information over a polar region of the flight to the route-information providing server 200, and flies over the polar routes based on the received information; and
   a network 400 which relays data among the satellite 100, the route-information providing server 200 and the flight vehicle 300,
   wherein the route-information providing server 200 comprises:
      an aurora-distribution map generator 210 which generates an aurora-distribution map based on a distribution of aurora particles observed by the satellite;
      an ionosphere electromagnetic-wave absorption map generator 220 which generates an electromagnetic-wave absorption map based on change in space weather, comprising a solar flare or a proton event, to be displayed on the aurora-distribution map;
      a space-weather information generator 230 which generates a variety of graphs and forecasts about a solar radiation event (S), a geomagnetic storm (G), and a radio blackout (R); and
      a space-weather situation and forecast generator 240 which generates space-weather situations corresponding to past 24 hours, present and tomorrow with regard to each of the solar radiation event (S), the geomagnetic storm (G) and the radio blackout (R).

3. The system according to claim 2, further comprising a main controller 260 which controls a storage 270 to store the aurora-distribution map generated by the aurora-distribution map generator 210, the electromagnetic-wave absorption map generated by the ionosphere electromagnetic-wave absorption map generator 220, the graphs and forecasts generated by the space-weather information generator 230, and the space-weather situations corresponding to past 24 hours, present and tomorrow generated by the space-weather situation and forecast generator 240 with regard to each of the solar radiation event (S), the geomagnetic storm (G) and the radio blackout (R).

4. The system according to claim 3, further comprising a communicator 280 which transmits the data of the storage 270 to the flight vehicle 300 under control of the main controller 260.

5. The system according to claim 4, wherein the main controller 260 controls the communicator 280 to transmit various kinds of space weather information generated by the space-weather information generator 230 to the flight vehicle 300 so that the space weather can be displayed as initial icons on a display of the flight vehicle 300 and the display can display graphs corresponding to solar energetic proton flux, a Kp index, and an intensity of X-ray when a user clicks the corresponding icon.

6. The system according to claim 2, wherein the route-information providing server 200 further comprises a flight-vehicle image and information display 250 which displays the present location of the flight vehicle 300 as an image together with the aurora-distribution map and the electromagnetic-wave absorption map on the display of the flight vehicle 300, and at the same time displays the location information and flight direction of the flight vehicle 300.

* * * * *